(12) United States Patent
Fang (10) Patent No.: US 9,588,929 B2
(45) Date of Patent: Mar. 7, 2017

(54) PCI-E STANDARD SELECTION SETTING SYSTEM AND MICROSERVER

(71) Applicants: INVENTEC (PUDONG) TECHNOLOGY CORPORATION, Shanghai (CN); INVENTEC CORPORATION, Taipei (TW)

(72) Inventor: Lan-Lan Fang, Shanghai (CN)

(73) Assignee: INVENTEC (PUDONG) TECHNOLOGY CORPORATION, Taipei (TW)

( * ) Notice: Subject to any disclaimer, the term of this patent is extended or adjusted under 35 U.S.C. 154(b) by 533 days.

(21) Appl. No.: 14/256,109

(22) Filed: Apr. 18, 2014

(65) Prior Publication Data

US 2015/0149685 A1 May 28, 2015

(30) Foreign Application Priority Data

Nov. 28, 2013 (CN) .......................... 2013 1 0627042

(51) Int. Cl.
*G06F 3/00* (2006.01)
*G06F 13/40* (2006.01)

(52) U.S. Cl.
CPC ...... *G06F 13/4068* (2013.01); *G06F 13/4022* (2013.01); *G06F 13/4063* (2013.01)

(58) Field of Classification Search
CPC .. G06F 13/4022; G06F 13/4068; G06F 13/00; G06F 13/4063; G06F 2213/0026; G06F 2213/0038
See application file for complete search history.

(56) References Cited

U.S. PATENT DOCUMENTS

2012/0278551 A1* 11/2012 Chakhaiyar ........... G06F 13/385
   711/114
2015/0012681 A1* 1/2015 Lakshmana-
   murthy ............... G06F 15/7864
   710/310

* cited by examiner

*Primary Examiner* — Ernest Unelus
(74) *Attorney, Agent, or Firm* — Bacon & Thomas, PLLC (57) ABSTRACT

A peripheral component interface-express (PCI-E) standard selection setting system and microserver are disclosed, in which a selection controller selects an arrangement setting in storage elements to arrange the PCI-E control chip, whereby each of the second PCI-E standard ports is or is not arranged as an upstream PCI-E standard port, so that a single PCI-E standard control chip may arrange one of the multitude of PCI-E standard ports as an upstream PCI-E standard port, so that the upstream PCI-E standard port may have a data transmission with one of the multitude of system on chips (SOCs) connected with the PCI-E standard control chip.

15 Claims, 4 Drawing Sheets

PCI-E STANDARD SELECTION SETTING SYSTEM AND MICROSERVER

BACKGROUND OF THE RELATED ART

Technical Field

A selection setting system and microserver, and particularly to a peripheral component interface-express (PCI-E) setting system and microserver.

Related Art

A peripheral component interface-express (PCI-E) has its transmission control, which is arranged by using a PCI-E standard control chip, generally using strapping signals. However, in real implementation, since the PCI-E standard control chip may only set one PCI-E standard port as the upstream PCI-E standard port at a single time without the capability of simultaneously arranging multiple upstream PCI-E standard port. Further, since the upstream PCI-E standard port may not be connected simultaneously, it is impossible to enable or disable the upstream PCI-E standard port.

When it is desired to simultaneously enable or disable the arrangement of the upstream PCI-E standard port, a multiple of PCI-E standard control chips are required to achieve in the arrangement of the PCI-E standard port. However, this may increase the manufacturing cost, there is thus a need to have an improvement on this issue.

In view of the above, it may be known that there has long been the issue where a single PCI-E standard control chip may not simultaneously arrange the upstream PCI-E standard port. Therefore, there is quite a need to set forth an improved technical means to settle down this problem.

SUMMARY

In view of the issue where a single peripheral component interface-express (PCI-E) standard control chip may not simultaneously arrange multiple upstream PCI-E standard port. A PCI-E standard selection setting system and microserver are disclosed in the present invention.

According to the present invention, the microserver comprises a system on chip (SOC), each having a first peripheral component interface-express (PCI-E) port; a PCI-E control chip, having a plurality of second PCI-E standard ports each electrically connected to the first PCI-E standard port corresponding thereto, and generating a first selection signal; a storage element, each electrically connected to the PCI-E control chip, and having an arrangement setting stored therein; and a selection controller, receiving the first selection signal to generate a plurality of second selection signals.

In the above, the each of the plurality of second selection signals corresponds to a corresponding one of the storage elements to control the arrangement setting stored in the storage element to arrange the PCI-E control chip, the arrangement setting selecting to arrange only one of the plurality of second PCI-E standard ports as an upstream PCI-E standard port and the upstream PCI-E standard port being electrically connected to the first PCI-E standard port for data transmission therebetween.

The microserver comprises at least a system on chip (SOC), each having a first peripheral component interface-express (PCI-E) port; a PCI-E control chip, having a plurality of second PCI-E standard ports each electrically connected to the first PCI-E standard port corresponding thereto, and generating a first selection signal; at least a storage element, each electrically connected to the PCI-E control chip and having an arrangement setting stored therein; and a selection controller, each electrically connected to each of the SOC to receives the first selection signal and a control signal generated by each of the SOC to generate the plurality of second selection signals each corresponding to one of the SOC.

In the above, the each of the plurality of second selection signals corresponds to a corresponding one of the storage elements to control the arrangement setting stored in the storage element to arrange the PCI-E control chip, the arrangement setting selecting to arrange only one of the plurality of second PCI-E standard ports as an upstream PCI-E standard port and the upstream PCI-E standard port being electrically connected to the first PCI-E standard port for data transmission therebetween.

The system and microserver of the present invention has the difference as compared to the prior art that the selection controller receives the first selection signal to produce a multitude of second selection signals each corresponding to and connected to a corresponding one of the storage elements to control the arrangement setting stored in the storage element to arrange the PCI-E control chip, the arrangement setting selecting to arrange only one of the plurality of second PCI-E standard ports as an upstream PCI-E standard port and the upstream PCI-E standard port being electrically connected to the first PCI-E standard port for data transmission therebetween.

By using the above technical means, the present invention may achieve in the result of arranging one of the multitude of PCI-E standard ports as the upstream PCI-E by the single PCI-E standard control chip, so that it may have a data transmission with one of the multitude of SOCs connected electrically with the PCI-E standard control chip.

BRIEF DESCRIPTION OF THE DRAWINGS

The invention will become more fully understood from the detailed description given herein below illustration only, and thus is not limitative of the present invention, and wherein.

DETAILED DESCRIPTION

The present invention will be apparent from the following detailed description, which proceeds with reference to the accompanying drawings, wherein the same references relate to the same elements.

Figure 1:
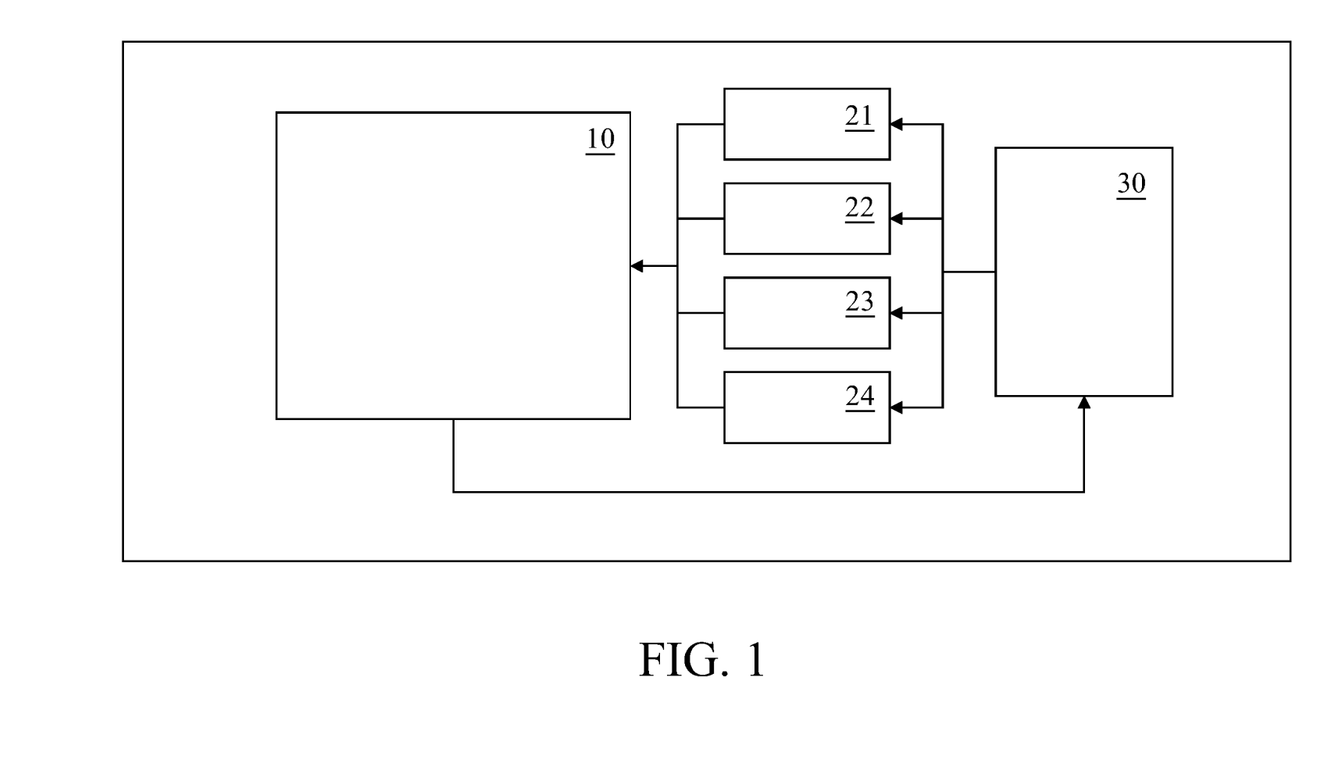
FIG. 1 is a systematic architecture diagram of a selection setting system of a peripheral component interface-express (PCI-E) standard according to the present invention.
Figure 2:
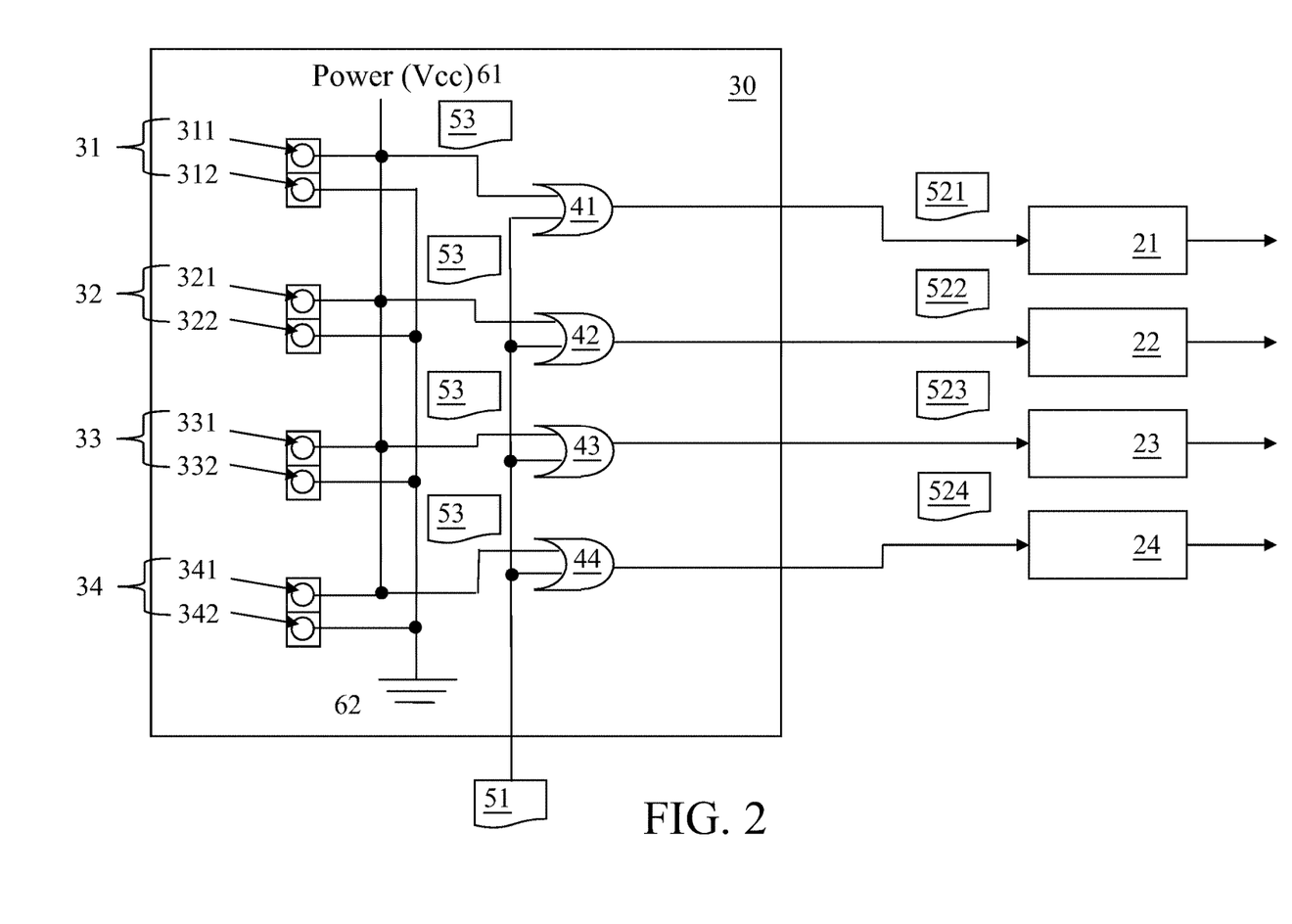
FIG. 2 is a systematic architecture diagram of a selection controller of a selection setting system of the PCI-E standard according to the present invention.

In the following, a selection setting system of a peripheral component interface-express (PCI-E) disclosed in the present invention will be described first, with simultaneously reference to FIG. 1 and FIG. 2, in which FIG. 1 is a systematic architecture diagram of a selection setting system of a peripheral component interface-express (PCI-E) standard according to the present invention, while FIG. 2 is a systematic architecture diagram of a selection controller of a selection setting system of the PCI-E standard according to the present invention.

The selection setting system of the PCI-E standard comprises a PCI standard control chip 10, a first storage element 21, a second storage element 22, a third storage element 23, a fourth storage element 24 and a selection controller 30. The selection controller 30 further comprises a first jumper 31, a second jumper 32, a third jumper 33, a fourth jumper 34, a first logic gate 41, a second logic gate 42, a third logic gate 43, and a fourth logic gate 44. The number of the storage elements, jumpers and logic gates is given only as examples, without limiting the present invention.

The PCI-E standard control chip 10 (such as the PEX8713 chip, merely an example, without limiting the present invention) is used to generate a first selection signal 51, and has a first storage element 21, a second storage element 22, a third storage elements 23, and a fourth storage element 24, connected to the PCI-E standard control chip 10, respectively. In the first to fourth storage elements 21, 22, 23, 24, an arrangement setting is stored therein, respectively, and may each be an electrically-erasable programmable read-only memory (EEPROM). This is merely an example, without limiting the present invention.

In the selection controller 30, a first pin 311 of the first jumper 31 is connected to the first logic gate 41, and the first pin 311 of the first jumper 31 is connected to a power source 61, resulting in production of a third selection signal 53. The second pin. 312 of the first jumper 31 is connected to ground, and the first logic gate 41 of the PCI-E standard control chip 10 is connected to the first logic gate 41 to provide a first selection signal 51.

In the selection controller 30, the first pin 321 of the second jumper 32 is connected to the second logic gate 42. And the first pin 321 of the second jumper 32 is connected to a power source 61, resulting in production of a third selection signal 52. The second pin 322 of the second jumper 32 is connected to ground, and the PCI-E standard control chip 10 is connected to the second logic gate 42 to provide a first selection signal 51.

In the selection controller 30, the first pin 331 of the third jumper 33 is connected to the logic gate 43. And, the first pin 331 of the third jumper 33 is connected to the power source 61 to produce the third selection signal 53. And, the second pin 332 of the third jumper 33 is connected to the ground 62. Further, the PCI-E standard control chip 10 is connected to the third logic gate 43 to provide the first selection signal 51.

In the selection controller 30, the first pin 341 of the fourth jumper 34 is connected to the fourth logic gate 44. And, the first pin 341 of the fourth jumper 34 is connected to the power source 61 to produce the third selection signal 53. And, the second pin 342 of the fourth jumper 34 is connected to the ground 62. Further, the PCI-E standard control chip 10 is connected to the fourth logic gate 44 to provide the first selection signal 51.

When the PCI-E standard control chip 10 produces the first selection signal 51 as being valid, the valid state is logic low "0", and the first jumper 31 connects the first pin 311 of the first jumper 31 and the second pin 312 of the first jumper 31 through a connector to be selected. The first pin 311 of the first jumper 31 produces the third selection signal 53 as being valid "0". The second, third and fourth jumpers 32, 33, 34 are not selected, i.e. the third selection signal 53 produced by the first pin 321 of the second jumper 32, the first pin 331 of the third jumper 33 and the first pin 341 of the fourth jumper 34 is invalid state "1", respectively.

The third selection signal 53 "0" produced by the first pin 311 of the first jumper 31 and the first selection signal 51 "0" produced by the PCI-E standard control chip 10 are subject to a logic OR operation through the first logic gate 41 to produce a second selection signal 521 "0".

The third selection signal 53 "1" produced by the first pin 321 of the second jumper 32 and the first selection signal 51 "0" produced by the PCI-E standard control chip 10 are subject to a logic OR operation through the second logic gate 42 to produce a second selection signal 522 "1".

The third selection signal 53 "1" produced by the first pin 311 of the third jumper 33 and the first selection signal 51 "0" produced by the PCI-E standard control chip 10 are subject to a logic OR operation through the third logic gate 43 to produce a second selection signal 523 "1".

The third selection signal 53 "1" produced by the first pin 341 of the fourth jumper 34 and the first selection signal 51 "0" produced by the PCI-E standard control chip 10 are subject to a logic OR operation through the fourth logic gate 44 to produce a second selection signal 524 "1".

Since the second selection signal 521 has a valid state "0", an arrange setting in the first storage 21 connected to the second selection signal 521 is selected. Since the second selection signal 522 has an invalid state "1", an arrangement setting of the second storage element 22 connected to the second selection signal 523 is not selected. Since the second selection signal 523 has an invalid state "1", an arrangement setting in the third storage element 23 connected to the second selection signal 523 is not selected. Since the second selection signal 524 has an invalid state "1", an arrangement setting in the fourth storage element 24 connected to the second selection signal 524 is not selected.

By using the selected arrangement setting in the first storage element 21, the PCI-E standard control chip 10 may be arranged.

Figure 3:
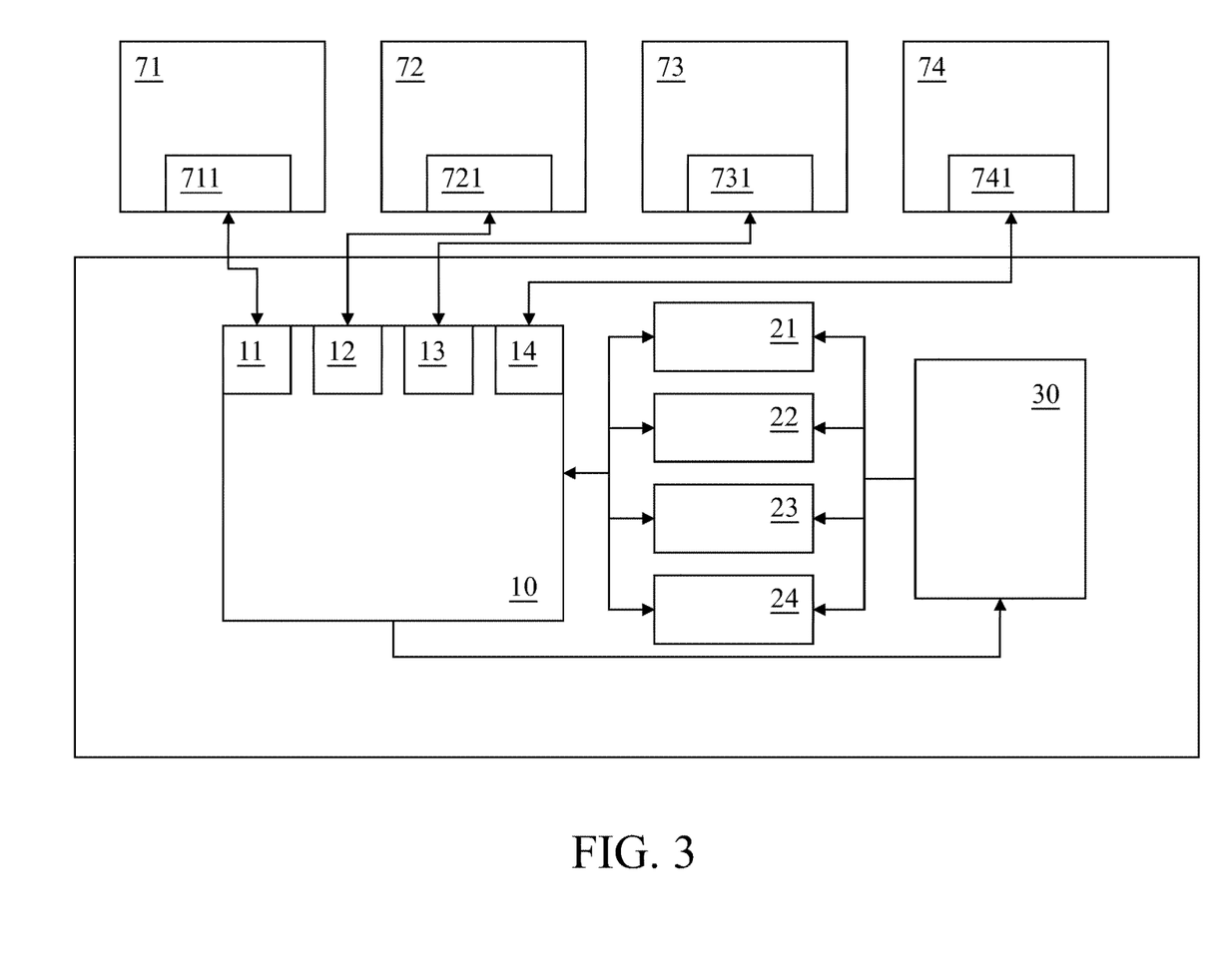
FIG. 3 is a systematic diagram of a microserver according to a first embodiment of the present invention.

Thereafter, the description will be continued with reference to FIG. 2 and FIG. 3, in which FIG. 3 is a systematic diagram of a microserver according to a first embodiment of the present invention.

The microserver according to the first embodiment of the present invention comprises a first system on chip (SOC) 71, a second SOC 72, a third SOC chip 73 and a fourth SOC chip 74, PCI-E standard control chip 10, a first storage element 21, a second storage element 22, a third storage element 23, a fourth storage element 24 and a selection controller 30. The selection controller 30 further comprises a first jumper 31, a second jumper 32, a third jumper 33, a fourth jumper 34, a first logic gate 41, a second logic gate 42, a third logic gate 43, and a fourth logic gate 44. The number of the storage elements, jumpers and logic gates is given only as examples, without limiting the present invention.

The first SOC chip 71 has a first PCI-E standard port 711, the second SOC chip 72 has a first PCI-E standard port 721, the third SOC chip 73 has a first PCI-E standard port 731, and the fourth SOC chip 74 has a first PCI-E standard port 741.

The PCI-E standard control chip 10 (such as the PEX8713 chip, merely an example, without limiting the present invention) has a second PCI-E standard port 11, a second PCI-E standard port 12, a second PCI-E standard port 13, and a second PCI-E standard port 14. The second PCI-E standard port 11 and the first PCI-E standard port 711 are electrically connected, the second PCI-E standard port 12 and the first PCI-E standard port 721 are electrically connected, the second PCI-E standard port 13 and the first PCI-E standard port 731 are electrically connected, the second PCI-E standard port 14 and the first PCI-E standard port 741 are electrically connected. And, the PCI-E standard chip 10 produces the first selection signal 51.

A first storage element 21, a second storage element 22, a third storage elements 23, and a fourth storage element 24 each have an arrangement setting stored therein, respectively, and may each be an electrically-erasable programmable read-only memory (EEPROM). This is merely an example, without limiting the present invention.

In the selection controller 30, a first pin 311 of the first jumper 31 is connected to the first logic gate 41, and the first pin 311 of the first jumper 31 is connected to a power source 61, resulting in production of a third selection signal 53. The second pin 312 of the first jumper 31 is connected to ground, and the first logic gate 41 of the PCI-E standard control chip 10 is connected to the first logic gate 41 to provide a first selection signal 51.

In the selection controller 30, the first pin 321 of the second jumper 32 is connected to the second logic gate 42. And the first pin 321 of the second jumper 32 is connected to a power source 61, resulting in production of a third selection signal 52. The second pin 322 of the second jumper 32 is connected to ground, and the PCI-E standard control chip 10 is connected to the second logic gate 42 to provide a first selection signal 51.

In the selection controller 30, the first pin 331 of the third jumper 33 is connected to the logic gate 43. And, the first pin 331 of the third jumper 33 is connected to the power source 61 to produce the third selection signal 53. And, the second pin 332 of the third jumper 33 is connected to the ground 62. Further, the PCI-E standard control chip 10 is connected to the third logic gate 43 to provide the first selection signal 51.

In the selection controller 30, the first pin 341 of the fourth jumper 34 is connected to the fourth logic gate 44. And, the first pin 331 of the third jumper 33 is connected to the power source 61 to produce the third selection signal 53. And, the second pin 342 of the fourth jumper 34 is connected to the ground 62. Further, the PCI-E standard control chip 10 is connected to the fourth logic gate 44 to provide the first selection signal 51.

When the PCI-E standard control chip 10 produces the first selection signal 51 as being valid, the valid state is logic low "0", and the first jumper 31 connects the first pin 311 of the first jumper 31 and the second pin 312 of the first jumper 31 through a connector to be selected. The first pin 311 of the first jumper 31 produces the third selection signal 53 as being valid "0". The second, third and fourth jumpers 32, 33, 34 are not selected, i.e. the third selection signal 53 produced by the first pin 321 of the second jumper 32, the first pin 331 of the third jumper 33 and the first pin 341 of the fourth jumper 34 is invalid state "1", respectively.

The third selection signal 53 "0" produced by the first pin 311 of the first jumper 31 and the first selection signal 51 "0" produced by the PCI-E standard control chip 10 are subject to a logic OR operation through the first logic gate 41 to produce a second selection signal 521 "0".

The third selection signal 53 "1" produced by the first pin 321 of the second jumper 32 and the first selection signal 51 "0" produced by the PCI-E standard control chip 10 are subject to a logic OR operation through the second logic gate 42 to produce a second selection signal 522 "1".

The third selection signal 53 "1" produced by the first pin 311 of the third jumper 33 and the first selection signal 51 "0" produced by the PCI-E standard control chip 10 are subject to a logic OR operation through the third logic gate 43 to produce a second selection signal 523 "1".

The third selection signal 53 "1" produced by the first pin 341 of the fourth jumper 34 and the first selection signal 51 "0" produced by the PCI-E standard control chip 10 are subject to a logic OR operation through the fourth logic gate 44 to produce a second selection signal 524 "1".

Since the second selection signal 521 has a valid state "0", an arrange setting in the first storage 21 connected to the second selection signal 521 is selected as "setting the second PCI-E standard port 11 as an upstream PCI-E standard port, while the second PCI-E standard ports 12, 13, 14 are not arranged as the upstream PCI-E standard port."

By using the selected arrangement setting in the first storage element 21 "setting the second PCI-E standard port 11 as an upstream PCI-E standard port, while the second PCI-E standard ports 12, 13, 14 are not arranged as the upstream PCI-E standard port", the second PCI-E standard ports 11, 12, 13, 14 are thus arranged.

The second PCI-E standard port 11 having been arranged as the upstream PCI-E standard port is electrically connected to the first PCI-E standard port 711 of the first SOC 71 for data transmission.

The second PCI-E standard port 12 having not been arranged as the upstream PCI-E standard port is electrically connected to the first PCI-E standard port 721 of the first SOC 72 but without data transmission occurring therebetween.

The second PCI-E standard port 13 having not been arranged as the upstream PCI-E standard port is electrically connected to the first PCI-E standard port 731 of the first SOC 73 but without data transmission occurring therebetween.

The second PCI-E standard port 14 having not been arranged as the upstream PCI-E standard port is electrically connected to the first PCI-E standard port 741 of the first SOC 74 but without data transmission occurring therebetween.

When the PCI-E standard control chip 10 produces the second selection signal 51 as being valid, the valid state is logic low "0", and the second jumper 32 connects the first pin 321 of the second jumper 32 and the second pin 322 of the second jumper 32 through a connector to be selected.

The second pin 321 of the second jumper 32 produces the third selection signal 53 as being valid "0". The first, third and fourth jumpers 31, 33, 34 are not selected, i.e. the third selection signal 53 produced by the first pin 321 of the first jumper 31, the first pin 331 of the third jumper 33 and the first pin 341 of the fourth jumper 34 is invalid state "1", respectively.

The third selection signal 53 "0" produced by the first pin 311 of the first jumper 31 and the first selection signal 51 "0" produced by the PCI-E standard control chip 10 are subject to a logic OR operation through the first logic gate 41 to produce a second selection signal 521 "1".

The third selection signal 53 "0" produced by the first pin 321 of the second jumper 32 and the first selection signal 51 "0" produced by the PCI-E standard control chip 10 are subject to a logic OR operation through the second logic gate 42 to produce a second selection signal 522 "0".

The third selection signal 53 "1" produced by the first pin 331 of the third jumper 33 and the first selection signal 51 "0" produced by the PCI-E standard control chip 10 are subject to a logic OR operation through the third logic gate 43 to produce a second selection signal 523 "1".

The third selection signal 53 "1" produced by the first pin 341 of the fourth jumper 34 and the first selection signal 51 "0" produced by the PCI-E standard control chip 10 are subject to a logic OR operation through the fourth logic gate 42 to produce a second selection signal 524 "1".

Since the second selection signal 522 has a valid state "0", an arrange setting in the second storage 22 connected to the second selection signal 522 is selected as "setting second PCI-E standard port 12 as an upstream PCI-E standard port, while the second PCI-E standard ports 11, 13, 14 are not arranged as the upstream PCI-E standard port."

By using the selected arrangement setting in the first storage element 21 "setting the second PCI-E standard port 12 as an upstream PCI-E standard port, while the second PCI-E standard ports 11, 13, 14 are not arranged as the upstream PCI-E standard port", the second PCI-E standard ports 11, 12, 13, 14 are thus arranged.

The second PCI-E standard port 11 having not been arranged as the upstream PCI-E standard port is electrically connected to the first PCI-E standard port 711 of the first SOC 71 for data transmission.

The second PCI-E standard port 12 having been arranged as the upstream PCI-E standard port is electrically connected to the first PCI-E standard port 721 of the first SOC 72 for data transmission.

The second PCI-E standard port 13 having not been arranged as the upstream PCI-E standard port is electrically connected to the first PCI-E standard port 731 of the first SOC 73 but without data transmission occurring therebetween.

The second PCI-E standard port 14 having not been arranged as the upstream PCI-E standard port is electrically connected to the first PCI-E standard port 741 of the first SOC 74 but without data transmission occurring therebetween.

When the PCI-E standard control chip 10 produces the second selection signal 51 as being valid, the valid state is logic low "0", and the third jumper 33 connects the first pin 331 of the third jumper 33 and the third pin 322 of the third jumper 33 through a connector to be selected. The first pin 331 of the third jumper 33 produces the third selection signal 53 as being valid "0". The first, second and fourth jumpers 31, 33, 34 are not selected, i.e. the third selection signal 53 produced by the first pin 311 of the first jumper 31, the first pin 321 of the second jumper 32 and the first pin 341 of the fourth jumper 34 is invalid state "1", respectively.

The third selection signal 53 "1" produced by the first pin 311 of the first jumper 31 and the first selection signal 51 "0" produced by the PCI-E standard control chip 10 are subject to a logic OR operation through the first logic gate 41 to produce a second selection signal 521 "1".

The third selection signal 53 "1" produced by the first pin 321 of the second jumper 32 and the first selection signal 51 "0" produced by the PCI-E standard control chip 10 are subject to a logic OR operation through the second logic gate 42 to produce a second selection signal 522 "1".

The third selection signal 53 "0" produced by the first pin 331 of the third jumper 33 and the first selection signal 51 "0" produced by the PCI-E standard control chip 10 are subject to a logic OR operation through the third logic gate 43 to produce a second selection signal 523 "0".

The third selection signal 53 "1" produced by the first pin 341 of the fourth jumper 34 and the first selection signal 51 "0" produced by the PCI-E standard control chip 10 are subject to a logic OR operation through the fourth logic gate 42 to produce a second selection signal 524 "1".

Since the second selection signal 523 has a valid state "0", an arrange setting in the third storage 23 connected to the second selection signal 523 is selected as "setting second PCI-E standard port 13 as an upstream PCI-E standard port, while the second PCI-E standard ports 11, 12, 14 are not arranged as the upstream PCI-E standard port."

By using the selected arrangement setting in the first storage element 21 "setting the second PCI-E standard port 13 as an upstream PCI-E standard port, while the second PCI-E standard ports 11, 13, 14 are not arranged as the upstream PCI-E standard port", the second PCI-E standard ports 11, 12, 13, 14 are thus arranged.

The second PCI-E standard port 11 having not been arranged as the upstream PCI-E standard port is electrically connected to the first PCI-E standard port 711 of the first SOC 71 but without any data transmission occurring therebetween.

The second PCI-E standard port 12 having not been arranged as the upstream PCI-E standard port is electrically connected to the first PCI-E standard port 721 of the first SOC 72 but without any data transmission occurring therebetween.

The second PCI-E standard port 13 having been arranged as the upstream PCI-E standard port is electrically connected to the first PCI-E standard port 731 of the first SOC 73 for data transmission.

The second PCI-E standard port 14 having not been arranged as the upstream PCI-E standard port is electrically connected to the first PCI-E standard port 741 of the first SOC 74 but without data transmission occurring therebetween.

When the PCI-E standard control chip 10 produces the second selection signal 51 as being valid, the valid state is logic low "0", and the third jumper 34 connects the first pin 341 of the fourth jumper 34 and the third pin 342 of the fourth jumper 34 through a connector to be selected.

The first pin 341 of the fourth jumper 34 produces the third selection signal 53 as being valid "0" The first, second and third jumpers 31, 32, 33 are not selected, i.e. the third selection signal 53 produced by the first pin 311 of the first jumper 31, the second pin 321 of the second jumper 32, and the first pin 331 of the third jumper 33 is invalid state "1", respectively.

The third selection signal 53 "1" produced by the first pin 311 of the first jumper 31 and the first selection signal 51 "0" produced by the PCI-E standard control chip 10 are subject to a logic OR operation through the first logic gate 41 to produce a second selection signal 521 "1".

The third selection signal 53 "1" produced by the first pin 321 of the second jumper 32 and the first selection signal 51 "0" produced by the PCI-E standard control chip 10 are subject to a logic OR operation through the second logic gate 42 to produce a second selection signal 522 "1".

The third selection signal 53 "1" produced by the first pin 311 of the third jumper 33 and the first selection signal 51 "0" produced by the PCI-E standard control chip 10 are subject to a logic OR operation through the third logic gate 43 to produce a second selection signal 523 "1".

The third selection signal 53 "0" produced by the first pin 341 of the fourth jumper 34 and the first selection signal 51 "0" produced by the PCI-E standard control chip 10 are subject to a logic OR operation through the fourth logic gate 42 to produce a second selection signal 524 "0".

Since the second selection signal 524 has a valid state "0", an arrange setting in the second storage 24 connected to the second selection signal 524 is selected as "setting second PCI-E standard port 12 as an upstream PCI-E standard port, while the second PCI-E standard ports 11, 12, 13 are not arranged as the upstream PCI-E standard port."

By using the selected arrangement setting in the first storage element 21 "setting the second PCI-E standard port 14 as an upstream PCI-E standard port, while the second PCI-E standard ports 11, 12, 13 are not arranged as the upstream PCI-E standard port", the second PCI-E standard ports 11, 12, 13, 14 are thus arranged.

The second PCI-E standard port 11 having not been arranged as the upstream PCI-E standard port is electrically connected to the first PCI-E standard port 711 of the first SOC 71 but without data transmission occurring therebetween.

The second PCI-E standard port 12 having not been arranged as the upstream PCI-E standard port is electrically connected to the first PCI-E standard port 721 of the first SOC 72 but without data transmission occurring therebetween.

The second PCI-E standard port 13 having not been arranged as the upstream PCI-E standard port is electrically connected to the first PCI-E standard port 731 of the first SOC 73 but without data transmission occurring therebetween.

The second PCI-E standard port 14 having been arranged as the upstream PCI-E standard port is electrically connected to the first PCI-E standard port 741 of the first SOC 74 for data transmission.

The above mentioned PCI_E standard control chip 10 further comprises a universal serial bus (USB) 151, a serial advanced technology attachment (SATA) 152 and an accelerated graphics port (AGP) 153, and an always on management port 154.

Figure 4:
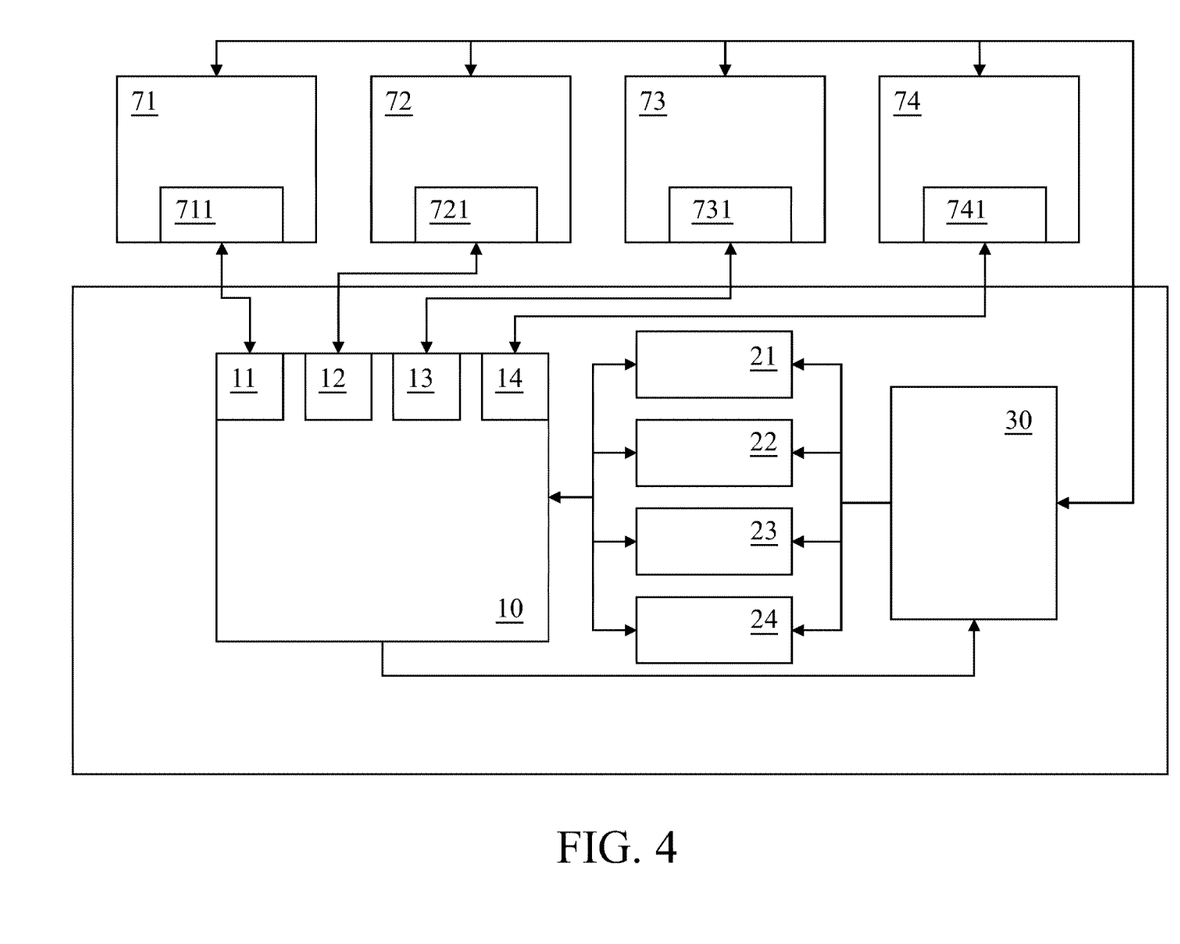
FIG. 4 is a systematic diagram of the microserver according to a second embodiment of the present invention.

Thereafter, the description is continued with reference to FIG. 4, in which a systematic diagram of the microserver according to a second embodiment of the present invention is shown.

The microserver according to the second embodiment of the present invention comprises a first system on chip (SOC) 71, a second SOC 72, a third SOC chip 73 and a fourth SOC chip 74, PCI-E standard control chip 10, a first storage element 21, a second storage element 22, a third storage element 23, a fourth storage element 24 and a selection controller 30. The number of the SOCs and the storage elements is given only as examples, respectively, without limiting the present invention.

The first SOC chip 71 has a first PCI-E standard port 711, the second SOC chip 72 has a first PCI-E standard port 721, the third SOC chip 73 has a first PCI-E standard port 731, and the fourth SOC chip 74 has a first PCI-E standard port 741.

The PCI-E standard control chip 10 (such as the PEX8713 chip, merely an example, without limiting the present invention) has a second PCI-E standard port 11, a second PCI-E standard port 12, a second PCI-E standard port 13, and a second PCI-E standard port 14. The second PCI-E standard port 11 and the first PCI-E standard port 711 are electrically connected, the second PCI-E standard port 12 and the first PCI-E standard port 721 are electrically connected, the second PCI-E standard port 13 and the first PCI-E standard port 731 are electrically connected, the second PCI-E standard port 14 and the first PCI-E standard port 741 are electrically connected. And, the PCI-E standard chip 10 produces the first selection signal 51.

A first storage element 21, a second storage element 22, a third storage elements 23, and a fourth storage element 24 each have an arrangement setting stored therein, respectively, and may each be an electrically-erasable programmable read-only memory (EEPROM). This is merely an example, without limiting the present invention.

The selection controller 30 may be implemented by a complex programmable logic device (CPLD) or a field-programmable gate array (FPGA).

Namely, the selection controller 30 is electrically connected to a first SOC 71, a second SOC 72, a third SOC chip 73 and a fourth SOC 74, respectively. As such, the selection controller 30 may receive a first selection signal form the PCI_E standard control chip 10, and produce a second selection signal from the first, second, third and fourth SOC 71, 72, 73, 74, respectively. And, each of the second selection signals correspond to the first, second, third, and fourth SOC 71, 72, 73, 74, respectively.

When the second selection signal produced from operation by the selection controller 30 selects the first storage element 21 to have the arrangement setting "setting the second PCI-E standard port 11 as an upstream PCI-E standard port, while the second PCI-E standard ports 12, 13, 14 are not arranged as the upstream PCI-E standard port", whereby the second PCI-E standard ports 11, 12, 13, 14 are thus arranged.

The second PCI-E standard port 11 having been arranged as the upstream PCI-E standard port is electrically connected to the first PCI-E standard port 711 of the first SOC 71 for data transmission.

The second PCI-E standard port 12 having not been arranged as the upstream PCI-E standard port is electrically connected to the first PCI-E standard port 721 of the first SOC 72 but without data transmission occurring therebetween.

The second PCI-E standard port 13 having not been arranged as the upstream PCI-E standard port is electrically connected to the first PCI-E standard port 731 of the first SOC 73 but without data transmission occurring therebetween.

When the second selection signal produced from operation by the selection controller 30 selects the second storage element 22 to have the arrangement setting "setting the second PCI-E standard port 12 as an upstream PCI-E standard port, while the second PCI-E standard ports 11, 13, 14 are not arranged as the upstream PCI-E standard port", whereby the second PCI-E standard ports 11, 12, 13, 14 are thus arranged.

The second PCI-E standard port 11 having not been arranged as the upstream PCI-E standard port is electrically connected to the first PCI-E standard port 711 of the first SOC 71 but without data transmission occurring therebetween.

The second PCI-E standard port 12 having been arranged as the upstream PCI-E standard port is electrically connected to the first PCI-E standard port 721 of the first SOC 72 for data transmission therebetween.

The second PCI-E standard port 13 having not been arranged as the upstream PCI-E standard port is electrically connected to the first PCI-E standard port 731 of the first SOC 73 but without data transmission occurring therebetween.

The second PCI-E standard port 14 having not been arranged as the upstream PCI-E standard port is electrically connected to the first PCI-E standard port 741 of the first SOC 74 but without data transmission occurring therebetween.

When the second selection signal produced from operation by the selection controller 30 selects the third storage element 23 to have the arrangement setting "setting the second PCI-E standard port 13 as an upstream PCI-E standard port, while the second PCI-E standard ports 11, 12, 14 are not arranged as the upstream PCI-E standard port", whereby the second PCI-E standard ports 11, 12, 13, 14 are thus arranged.

The second PCI-E standard port 11 having not been arranged as the upstream PCI-E standard port is electrically connected to the first PCI-E standard port 711 of the first SOC 71 but without any data transmission occurring therebetween.

The second PCI-E standard port 12 having not been arranged as the upstream PCI-E standard port is electrically connected to the first PCI-E standard port 721 of the first SOC 72 but without any data transmission occurring therebetween.

The second PCI-E standard port 13 having been arranged as the upstream PCI-E standard port is electrically connected to the first PCI-E standard port 731 of the first SOC 73 for data transmission therebetween.

The second PCI-E standard port 14 having not been arranged as the upstream PCI-E standard port is electrically connected to the first PCI-E standard port 741 of the first SOC 74 but without data transmission occurring therebetween.

When the second selection signal produced from operation of the selection controller 30 selects the arrangement setting in the forth storage element 24 as "setting the second PCI-E standard port 14 as an upstream PCI-E standard port, while the second PCI-E standard ports 11, 12, 13 are not arranged as the upstream PCI-E standard port" As such, the setting of the second PCI-E standard port 11,12, 13 and 14 in the PCI-E standard control chip 10 may be respectively arranged.

The second PCI-E standard port 11 having not been arranged as the upstream PCI-E standard port is electrically connected to the first PCI-E standard port 711 of the first SOC 71 but without any data transmission occurring therebetween.

The second PCI-E standard port 12 having not been arranged as the upstream PCI-E standard port is electrically connected to the first PCI-E standard port 721 of the first SOC 72 but without any data transmission occurring therebetween.

The second PCI-E standard port 13 having not been arranged as the upstream PCI-E standard port is electrically connected to the first PCI-E standard port 731 of the first SOC 73 without data transmission occurring therebetween.

The second PCI-E standard port 14 having been arranged as the upstream PCI-E standard port is electrically connected to the first PCI-E standard port 741 of the first SOC 74 for data transmission occurring therebetween.

In view of the above, it may be known that the present invention has the difference as compared to the prior art that the selection controller receives the first selection signal to produce a multitude of second selection signals each corresponding to and connected to a corresponding one of the storage elements to control the arrangement setting stored in the storage element to arrange the PCI-E control chip, the arrangement setting selecting to arrange only one of the plurality of second PCI-E standard ports as an upstream PCI-E standard port while the other second PCI-E standard ports are not arranged as the upstream PCI-E standard port, the upstream PCI-E standard port being electrically connected to the first PCI-E standard port for data transmission therebetween.

By using the above technical means, the present invention may achieve in the result of arranging one of the multitude of PCI-E standard ports as the upstream PCI-E by the single PCI-E standard control chip, whereby overcoming the issue that a single PCI-E standard control chip may not simultaneously arrange the upstream CPI-E standard port, so that it may achieve in the technical efficacy of having a data transmission with one of the multitude of SOCs connected electrically with the PCI-E standard control chip.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A microserver, comprising:
    at least one system on chip (SOC), each having a first peripheral component interface-express (PCI-E) port;
    a PCI-E control chip, having a plurality of second PCI-E ports, each electrically connected to the first PCI-E port corresponding thereto, and generating a first selection signal; and
    at least one storage element, each directly electrically connected between the PCI-E control chip and a selection controller, and having an arrangement setting stored therein
    wherein the selection controller directly receives one said first selection signal from the PCI-E control chip to generate a plurality of second selection signals,
    wherein each of the plurality of second selection signals corresponds to one said storage element to control the arrangement setting stored in the storage element, the arrangement setting arranging only one of the plurality of second PCI-E ports as an upstream PCI-E port, and the upstream PCI-E port being electrically connected to the first PCI-E port for data transmission therebetween.

2. The microserver as claimed in claim 1, wherein the storage element controls the arrangement setting to select the upstream PCI-E port by using a chip select (CS) signal and the corresponding one of the plurality of second selection signals, and the storage element is electrically connected to the PCI-E control chip to transmit the selected arrangement setting to the PCI-E control chip for the arrangement.

3. The microserver as claimed in claim 1, wherein only one of the plurality of second selection signals is at a valid state.

4. The microserver as claimed in claim 1, wherein the selection controller further comprises a plurality of jumpers and a plurality of logic gates each corresponding to a corresponding one of the plurality of jumpers.

5. The microserver as claimed in claim 4, wherein each of the plurality of jumpers is composed of a first pin and a second pin, the first pin being connected to a power source to generate a third selection signal, the second pin being connected to ground, and each of the plurality of logic gates receives and has an OR logic operation on the first selection signal and the third selection signal corresponding thereto, to generate the second selection signal, respectively.

6. The microserver as claimed in claim 5, wherein one of the plurality of pins connects the first pin and the second pin through a jumper cap and is thus selected, the third selection signal generated by the first pin is at a valid state and has an OR logic operation with one of the plurality of logic gates corresponding to the selected one of the plurality of jumpers when the first selection signal is at a valid state, to generate the second selection signal at a valid state being logic low.

7. The microserver as claimed in claim 1, wherein the PCI-E control chip further comprises a universal serial bus (USB), a serial advanced technology attachment (SATA) and accelerated graphics port (AGP), and a management port at a always-on state.

8. A microserver, comprising:
- at least one system on chip (SOC), each having a first peripheral component interface-express (PCI-E) port;
- a PCI-E control chip, having a plurality of second PCI-E ports, each electrically connected to the first PCI-E port corresponding thereto, and generating a first selection signal; and
- at least one storage element, each directly electrically connected between the PCI-E control chip and a selection controller, and having an arrangement setting stored therein
- wherein the selection controller is electrically connected to each SOC to receive the first selection signal directly from the PCI-E control chip and a control signal generated by each SOC to generate a plurality of second selection signals, each second selection signal corresponding to one said SOC,
- wherein each of the plurality of second selection signals corresponds to one said storage element to control the arrangement setting stored in the storage element, the arrangement setting arranging only one of the plurality of second PCI-E ports as an upstream PCI-E port, and the upstream PCI-E port being electrically connected to the first PCI-E port for data transmission therebetween.

9. The microserver as claimed in claim 8, wherein the selection controller is a complex programmable logic device (CPLD) or a field programmable gate array (FPGA).

10. A peripheral component interface-express (PCI-E) selection setting system, comprising:
- at least one system on chip (SOC), each having a first peripheral component interface-express (PCI-E) port;
- a PCI-E control chip, having a plurality of second PCI-E ports, each electrically connected to the first PCI-E port corresponding thereto, and generating a first selection signal; and
- at least one storage element, each directly electrically connected between the PCI-E control chip and a selection controller, and having an arrangement setting stored therein and
- wherein the selection controller directly receives one said first selection signal from the PCI-E control chip to generate a plurality of second selection signals, each corresponding to one of the storage element to control the arrangement setting in the storage element to arrange the PCI-E control chip.

11. The PCI-E selection setting system as claimed in claim 10, wherein the storage element controls the arrangement setting to select the upstream PCI-E port by using a chip select (CS) signal and the corresponding one of the plurality of second selection signals, and the storage element is electrically connected to the PCI-E control chip to transmit the selected arrangement setting to the PCI-E control chip for the arrangement.

12. The PCI-E selection setting system as claimed in claim 10, wherein only one of the plurality of second selection signals is at a valid state.

13. The PCI-E selection setting system as claimed in claim 10, wherein the selection controller further comprises a plurality of jumpers and a plurality of logic gates each corresponding to a corresponding one of the plurality of jumpers.

14. The PCI-E selection setting system as claimed in claim 13, wherein each of the plurality of jumpers is composed of a first pin and a second pin, the first pin being connected to a power source to generate a third selection signal, the second pin being connected to ground, and each of the plurality of logic gates receives and has an OR logic operation on the first selection signal and the third selection signal corresponding thereto, to generate the second selection signal, respectively.

15. The PCI-E selection setting system as claimed in claim 14, wherein one of the plurality of pins connects the first pin and the second pin through a jumper cap and is thus selected, the third selection signal generated by the first pin is at a valid state and has an OR logic operation with one of the plurality of logic gates corresponding to the selected one of the plurality of jumpers when the first selection signal is at a valid state, to generate the second selection signal at a valid state being logic low.

\* \* \* \* \*